May 17, 1966  J. T. FANCHER  3,251,485
BALE BUNCHER

Filed May 7, 1964  10 Sheets-Sheet 3

INVENTOR.
JOHN T. FANCHER
BY
ATTYS.

May 17, 1966  J. T. FANCHER  3,251,485
BALE BUNCHER

Filed May 7, 1964  10 Sheets-Sheet 8

INVENTOR.
JOHN T. FANCHER
BY *Wells & St. John*
ATTYS.

May 17, 1966  J. T. FANCHER  3,251,485
BALE BUNCHER

Filed May 7, 1964  10 Sheets-Sheet 10

INVENTOR.
JOHN T. FANCHER

BY
ATTYS.

3,251,485
BALE BUNCHER
John T. Fancher, Tonasket, Wash.
Filed May 7, 1964, Ser. No. 365,711
7 Claims. (Cl. 214—6)

This invention relates to a novel bale buncher for gathering hay previously baled in a field.

It is a common practice in the harvesting of hay to bale the crop in the field, dropping the completed bales at random as the baling machine travels back and forth across the field. The bales must then be gathered and stacked at storage locations for use during the winter, or must be stacked for transport to other locations. Such bales are quite heavy, and rather bulky to handle. Various devices have been proposed for stacking bales automatically or semi-automatically, usually on a rather small scale. The present invention is concerned with a device for handling a large number of bales, gathering them into stacked positions, and transporting them by the same device to a storage location where the bales are dumped from the apparatus for later stacking. The present device is not designed to produce a finished stack of bales, since the desired stack is usually of a height too great to be carried about a field on a mobile apparatus. Instead, it is concerned with the compact gathering of hay bales in the field and the transporting of the bales to a location where they can be conveniently stacked.

It is a first object of this invention to provide a device having sufficient capacity to handle bales as normally found in the field without manual manipulation of the bales as they are gathered.

Another object of the invention is to provide such a device that will form multiple rows of stacked bales on a mobile bed that can be transported about the field and to a final delivery point.

Another object of this invention is to provide such a device that is mechanically simple so that it can be economically manufactured and utilized in a farming operation.

These and further objects will be evident from a study of the following description and the accompanying drawings, the drawings illustrating one preferred form of the invention. It is to be understood that this form of the invention, shown in detail, is not intended to limit or restrict the scope of the invention itself, which is defined in the claims that follow.

In the drawings:

FIGURES 11 through 16 are a series of schematic views illustrating the operation of the device;

The present device is basically concerned with the gathering and transporting of bales of hay in the field where the hay has been harvested. It basically utilizes an elevating conveyor that gathers and delivers the finished bales to an assembly area at the front of a mobile flat bed. At this assembly area, the elevated bales are dropped between four movable walls that progressively form individual stacks of bales to the desired height. As each stack is completed, it is shifted laterally so that the apparatus is ready to receive a second stack in the same initial location. In this manner, successive shifting of the stacked bales produces a lateral row of bales on the assembly area. This row of bales is then shifted rearwardly to a storage area on the same co-planar bed, so that the assembly area is again clear for the formation of another row of bales. This step by step process is repeated until the entire storage area is filled with stacked bales in both longitudinal and transverse rows. The mobile bed is then brought to the location where the gathered bales are desired and the storage area of the bed is tilted to drop the bales onto the ground. The bales will preferably remain in a loose stacked condition, but will probably have to be reassembled in a higher stack for either travel or storage purposes.

Referring now to the drawings, the general assembly can best be seen in FIGURES 1 through 5. It includes a mobile wheeled chassis having ground engaging wheels 11 powered by a conventional engine 12 located at the front of the chassis. A seat 13 is provided for the operator of the device, who is located adjacent to a series of conventional manually operated controls 14 by which he can control the stacking arrangement and the mobile chassis 10. The conventional driving arrangement for the wheels 11 is not shown in detail, and the conventional controls that might be utilized to operate the various devices on the chassis 10 also are not shown in detail in this description.

Mounted along one side of the operator at the front of the framework or chassis 10 is a bale delivery conveyor 15 that includes an upwardly directed conveyor chain 16 extending along slide surface 17. At the bottom of the conveyor are forwardly directed fingers 18 that serve to pick up and guide the bales onto the chain 16. This type of elevating conveyor is conventional in bale handling devices, and will not be further described in detail.

Directly behind the operator's seat 13 is a flat mobile bed formed in two sections, the first being a transverse assembly area 20 that extends across the width of the bed at its forward end. The second section is a storage area 21 adjacent to and rearward of the assembly area 20. The upper supporting surfaces of the assembly area 20 and the storage area 21 are co-planar, and each is formed in a rather conventional manner by cross channel members and sheets of wood or metal plates. The storage area 21 is bounded along its sides by rails 22 connected by overhead connections designated in the drawings as 23.

Figure 3:
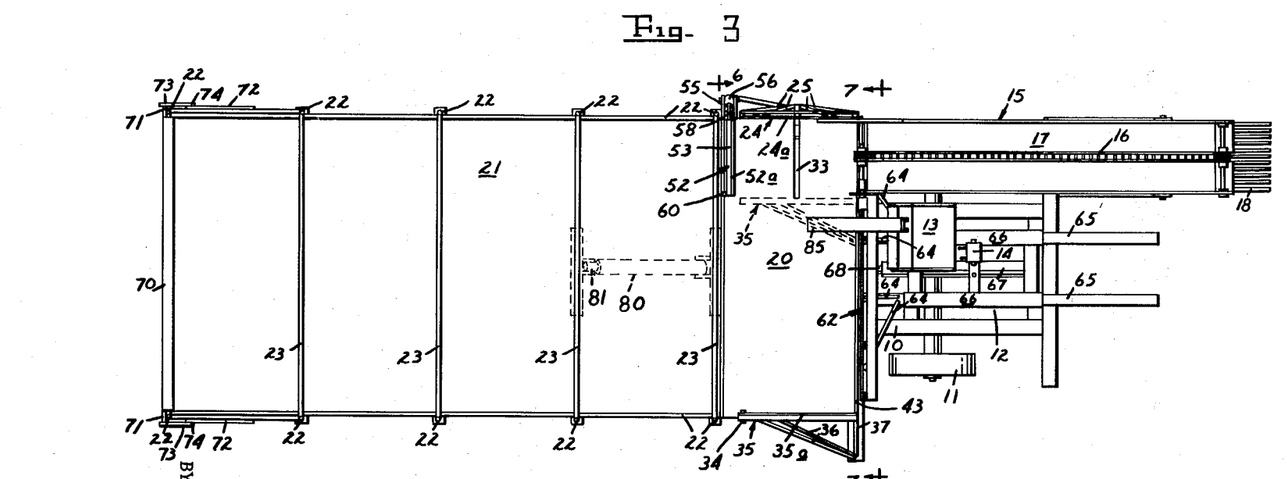
FIGURE 3 is a top view of the apparatus.
Figure 4:
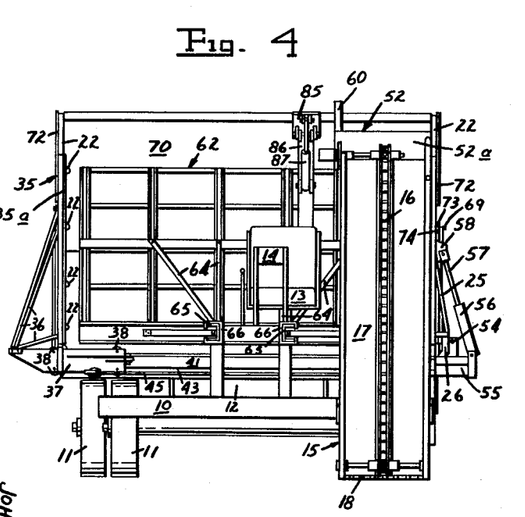
FIGURE 4 is a front end view of the apparatus.

As the bales are carried upwardly and rearwardly along the delivery conveyor by the chain 16, they are deposited in a stack at one edge of the assembly area 20, seen at the top of FIGURE 3. Again referring to FIGURE 3, this area wherein the bales are dropped is bounded by four upright movable walls, one wall being shown in its dashed line location in FIGURE 3 where it is located during the formation of the initial stack of bales on the assembly area 20. These four walls will now be individually described, both in relation to their structure and the manner in which they function.

Figure 1:
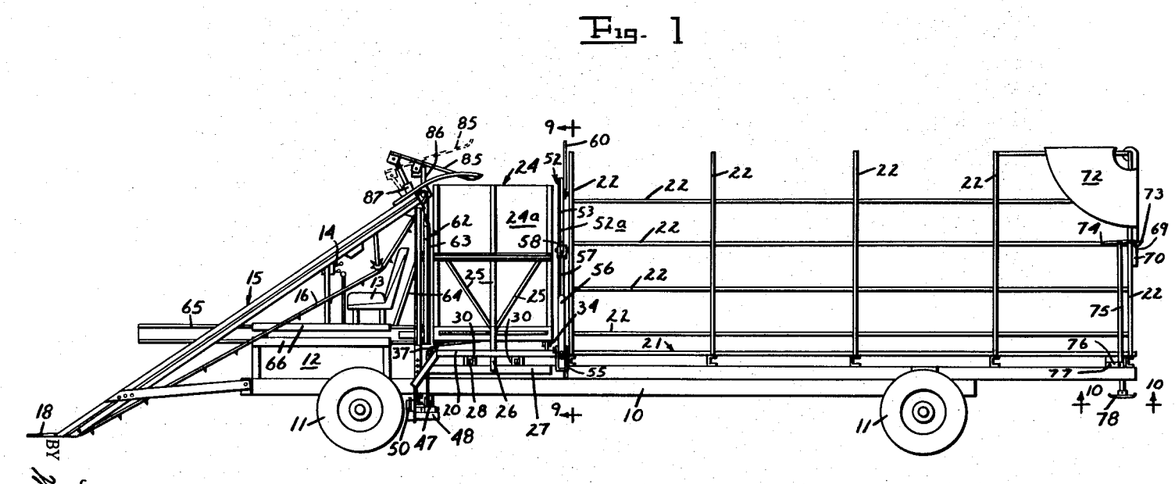
FIGURE 1 is a side elevation view of the complete apparatus.
Figure 8:
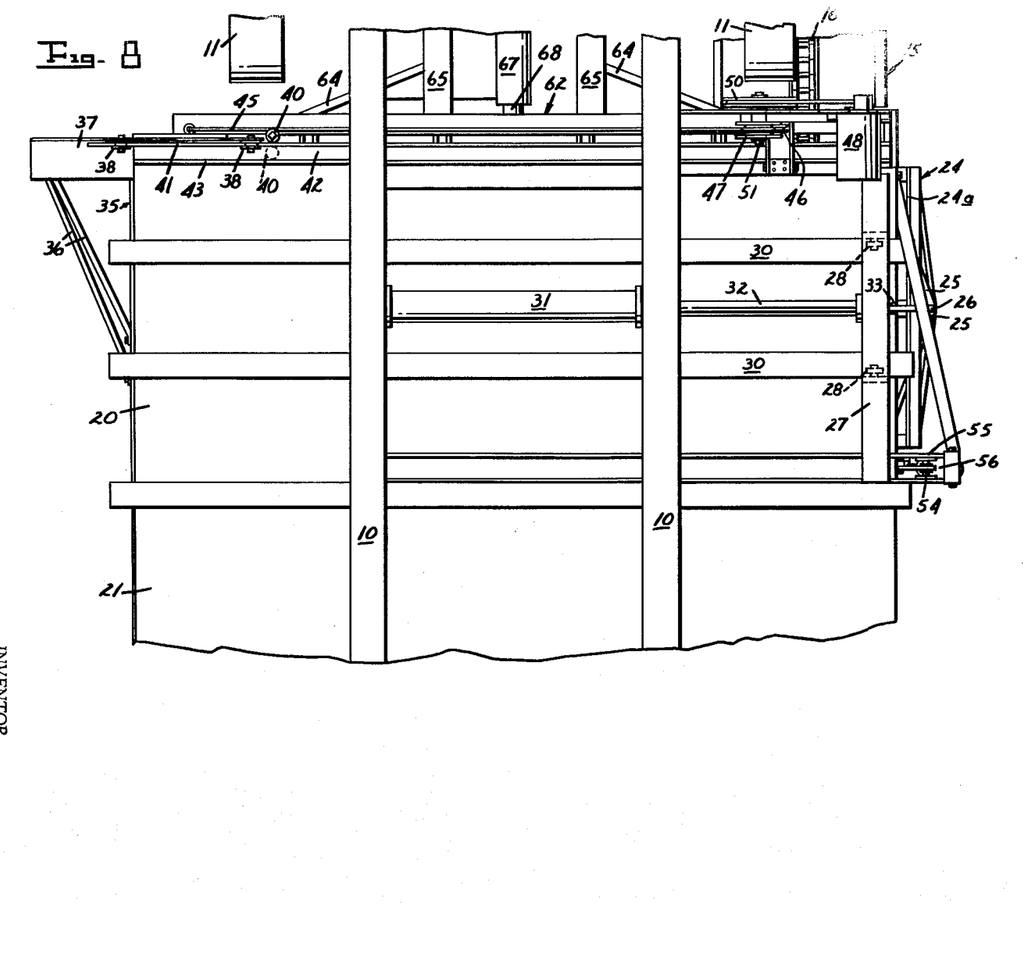
FIGURE 8 is an enlarged fragmentary bottom view of the apparatus as seen substantially along line 8—8 in FIGURE 2.
Figure 9:
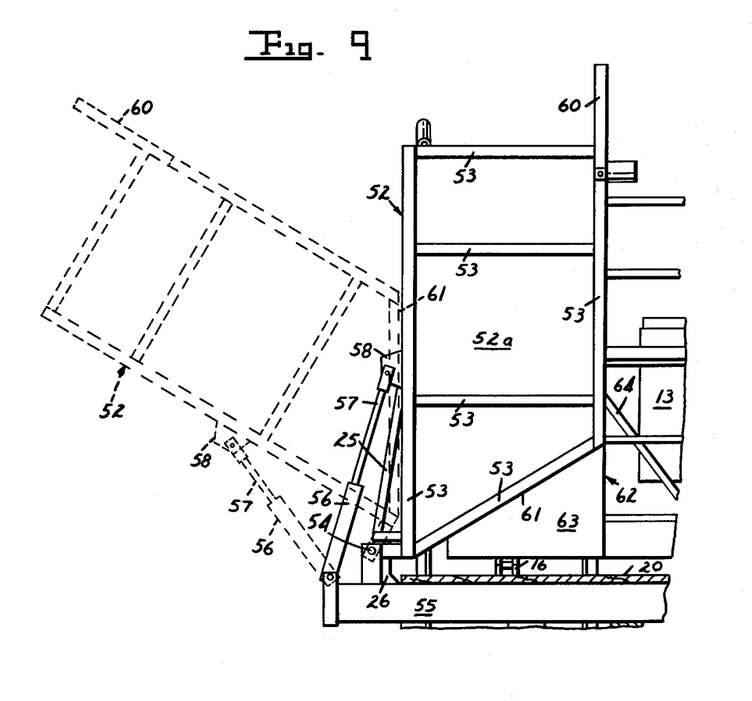
FIGURE 9 is an enlarged fragmentary sectional view of the apparatus as seen along line 9—9 in FIGURE 1, illustrating the alternate position of one wall in dashed lines.

The first wall 24 can best be seen in FIGURES 1, 3 and 8. It is an upright wall including a rectangular planar sheet 24a supported by downwardly extending braces 25, so that the wall 24 is free of any contact with the top surface of the assembly area 20. The braces 25 are fixed to an upright stand 26 that extends through a slot 33 formed transversely across a portion of the assembly area 20. The upright stand 26 is fastened to a perpendicular cross support 27 below the assembly area 20. This cross support 27 is carried on two transverse guide channels 30 (see FIGURE 8) by means of supporting rollers 28 that ride within the channels 30. In this manner, the wall 24 is maintained in its desired upright perpendicular position and is guided for transverse movement relative to the supporting bed of the assembly area 20.

Motion of the wall 24 is accomplished by means of a cylinder 31 located beneath the assembly area 20 and rigidly fastened to the chassis 10. The cylinder 31 is provided with a piston rod 32 fastened at its outer end to the cross support 27, so that expansion or contraction of the cylinder assembly will result in corresponding transverse movement of the wall 24 across the area in which bales are dumped by the chain 16.

The second wall 35 is best illustrated in FIGURES 2, 3, 6 and 7. In each of these figures, this wall 35 is shown in its fully extended outer position, and it is to be understood that this is not the initial position that the wall 35 assumes when first receiving bales on the assembly area 20. The initial position of the walls 35 is shown in dashed lines in FIGURE 3 and is situated at a spaced distance from the parallel first wall 24, the distance being equal to the width of the bales received to be stacked on the assembly area 20. However, for purposes of illustrating the structure, the wall 35 is drawn in most of the figures in its fully extended or outer position at the opposite side edge of the assembly area 20.

The wall 35 also includes a planar plate 35a adapted to abut the bales and provide a smooth contacting surface for aligning their edges. Wall 35 is provided with braces 36 that extend forwardly to a supporting dolly 37 that carries two pairs of top and bottom rollers 38 (FIGURES 6 and 7) as well as side guiding rollers 40. The rollers 38 and 40 ride along a guide plate 41 that is spaced from the end plate 43 of the mobile bed by means of a horizontal transverse rib 42. Thus, the dolly 37 is guided both transversely and longitudinally for free movement of the wall 35 across most of the width of the assembly area 20. The wall 35 rides above the top surface of the assembly area 20, and is provided with an outer support roller 34 that rolls along the top surface to better support the rear edge of the wall 35. The wall 35 is movable from the dashed line position shown in FIGURE 3 to the full line position shown in FIGURE 3 and in the remaining detail drawings.

Movement of the wall 35 is different in each of its directions of movement. Looking at FIGURE 3, the wall 35 initially must be positively located at the location shown in dashed lines. This requires a positive driving movement. However, in its operation, the wall 35 must yieldably move downwardly as shown in FIGURE 3, due to the successive transverse motion of the first wall 24, which pushes successive stacks of bales toward the second wall 35. By providing a yieldable motion of the wall 35 from the dashed line position to the full line position seen in FIGURE 3, the maintenance of a tight stacked condition in the bales being moved across the assembly area is insured.

Figure 6:
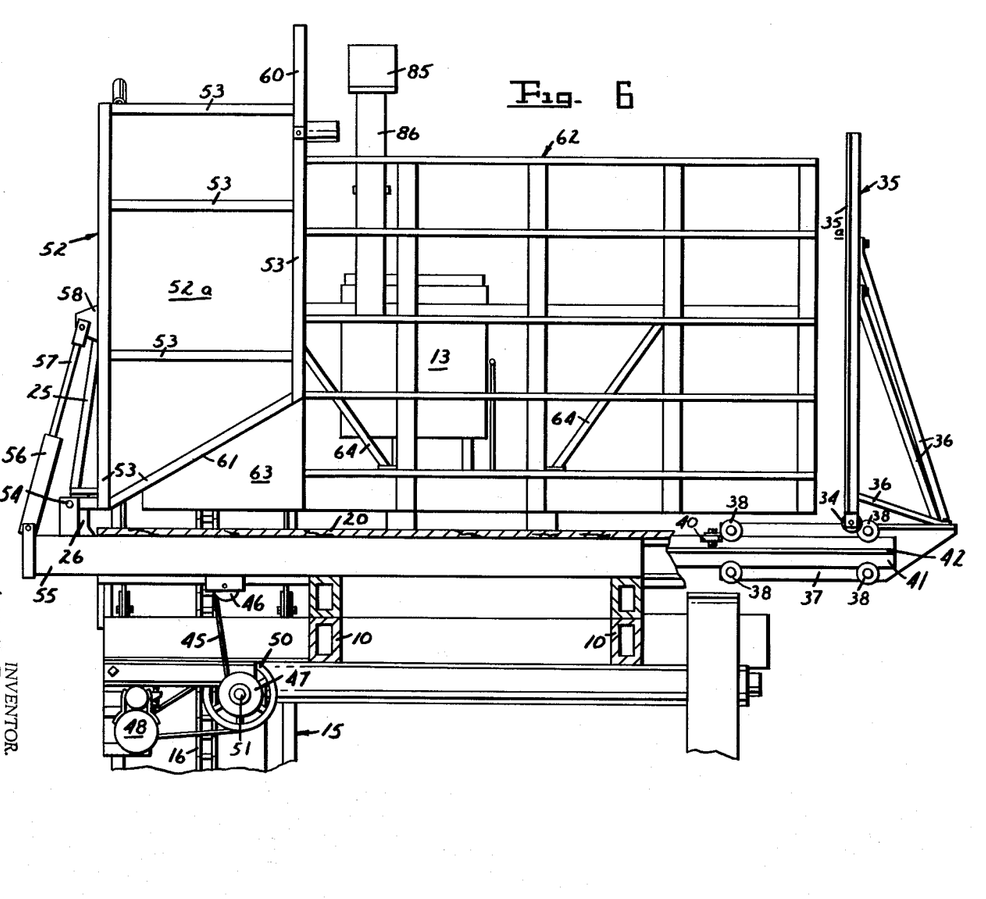
FIGURE 6 is an enlarged cross sectional view taken along line 6—6 in FIGURE 3, a portion of the mobile bed being broken away.
Figure 7:
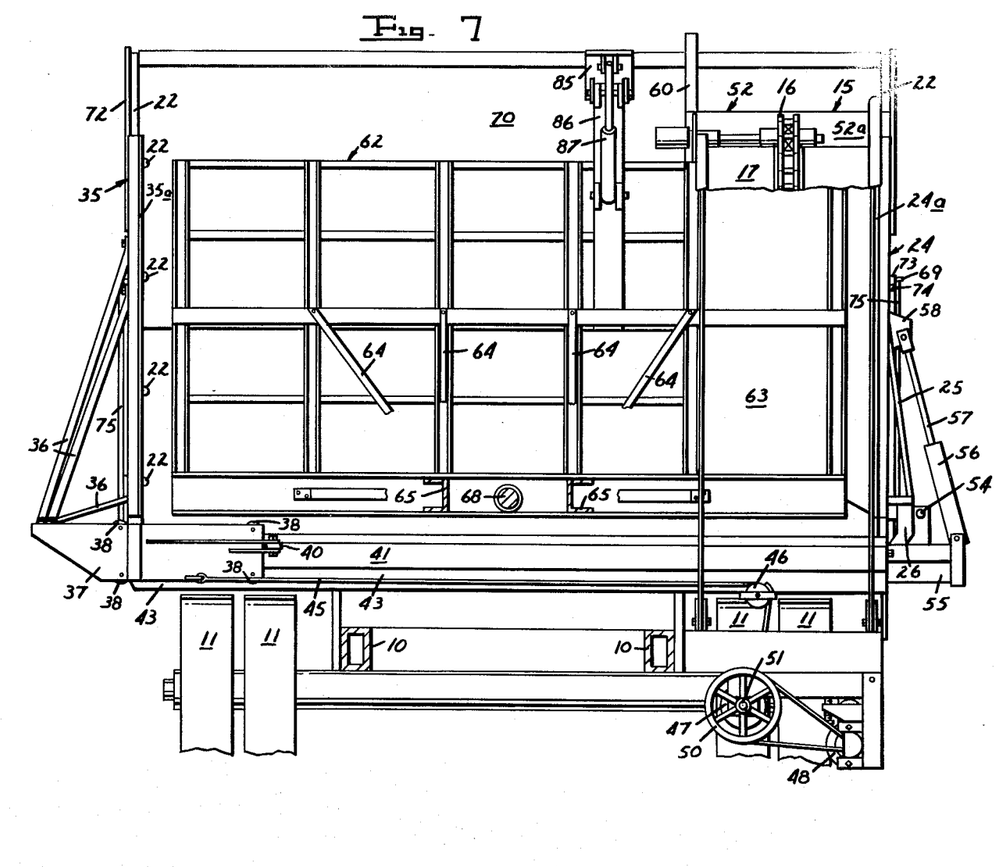
FIGURE 7 is an enlarged cross sectional view taken along line 7—7 in FIGURE 3.

Although many types of mechanisms could be used to provide this desired movement of the second wall 35, there is shown in FIGURES 6 and 7 one arrangement by which this desired result has been practically attained. This arrangement includes a cable 45 fixed at one end to the dolly 37 and wrapped over an idler pulley 46 on the front end plate 43. Cable 45 has its remaining end fastened to a winch or drum 47 powered by a motor 48 through a driven pulley 50 and a common shaft 51 fixed to both the driven pulley 50 and the drum 47. In this manner, the cable 45 can positively pull the second wall 35 to the right as seen in FIGURE 7, and the motor 48, when not energized, will provide an inertia drag that will resist movement of the wall 35 to the left, but will permit such movement when pushed by bales contacted and being moved by the first wall 24. The motor 48 need not be a heavy motor, and one typical installation has included a conventional starting motor from an automobile.

The third wall that serves to form the stacks of bales delivered by the conveyor chain is seen in FIGURES 1, 2, 3, 6 and 9. It extends across the rear edges of the first and second walls 24, 35 and provides a backstop for the rearwardly traveling bales as they are dumped onto the assembly area 20 by chain 16. The third wall 52 includes a flat plate 52a and braces 53 that extend to its lower outside corner. The braces 53 carry the wall 52 for pivotal movement about a shaft 54 mounted on a transverse support beam 55 fixed to the main chassis 10. The pivot shaft 54 is located outwardly of the assembly area 20, and is adapted to permit pivotal movement of the wall 52 from its full line position shown in FIGURE 9 to its dashed line position wherein it fully clears the assembly area 20. The lower edge 61 of the wall 52 is cut at an angle extending upwardly and inwardly from the outside lower corner of the wall 52 so that the wall 52 need not be pivoted a full 90 degrees in order to fully clear the assembly area 20. This structure is easily seen in FIGURES 6 and 9.

Pivoting of the wall 52 is accomplished by means of a cylinder 56 pivoted at its lower end to the previously described support beam 55, the piston rod 57 of the cylinder 56 being pivotally connected to the wall 52 by means of a bracket 58 along its outer edge. The wall 52 is also provided with an upstanding guide rod 60 fixed to its upper insider corner, the rod 60 being adapted to abut the adjacent cross support 23 on the storage area 21, to provide rearward support for the upper portion of the wall 52 and to prevent rearward movement of the wall 52 when abutted by rearwardly moving bales as they drop from the top of the conveyor chain 16.

Figure 2:
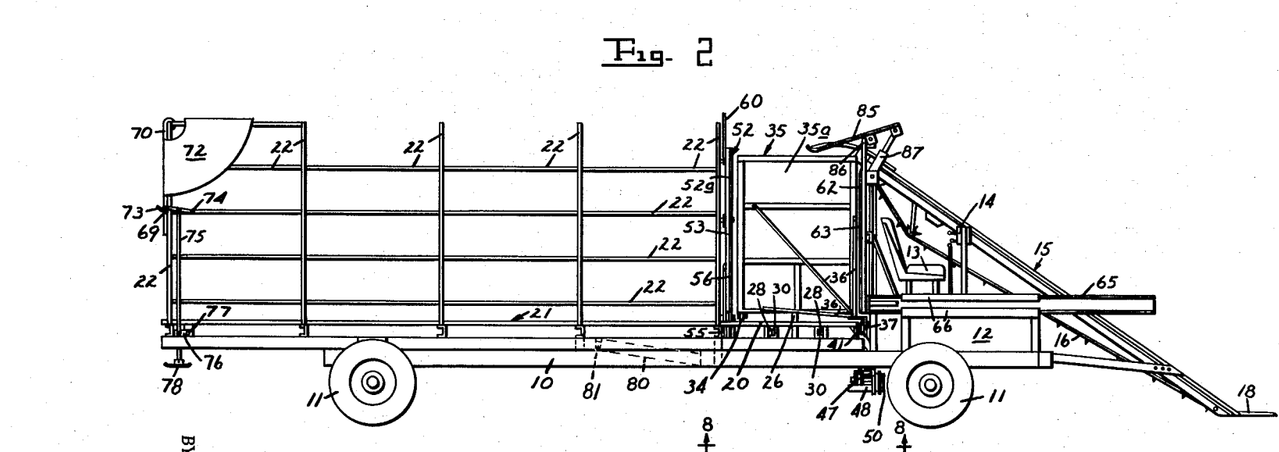
FIGURE 2 is a side elevation view opposite to FIGURE 1.

The fourth wall 62 with which this device is concerned extends across the front edge of the assembly area 20 as can be best seen in FIGURES 3, 4, 6 and 7. It is formed as a vertical rack with a solid upright plate 63 along one side thereof opposite to the wall 52. Thus, the wall surfaces engaged by the bales being stacked at the delivery end of chain 16 are all smooth inwardly facing plane surfaces so that the bales do not become engaged on any protruding edges or surfaces and can freely align themselves in a vertical stack. The wall 62 is supported by downwardly extending braces 64 fixed to the rear end of movable longitudinal channels 65 that protrude forwardly along the chassis 10. The channels 65 slide within outer enclosing channel members 66 fixed to the chassis 10 (FIGURE 2). The wall 62 is therefore substantially supported at a location above the top surface of the assembly area 20 for longitudinal movement in a forward or rearward direction over the area 20. Such movement is provided by a cylinder 67 fixed to the chassis 10 having a movable piston rod 68 that is connected to the front surface of wall 62. The wall 62 can therefore be moved back and forth across the full length of the assembly area 20 to push a prepared row of stacked bales rearwardly onto the storage area 21.

Figure 5:
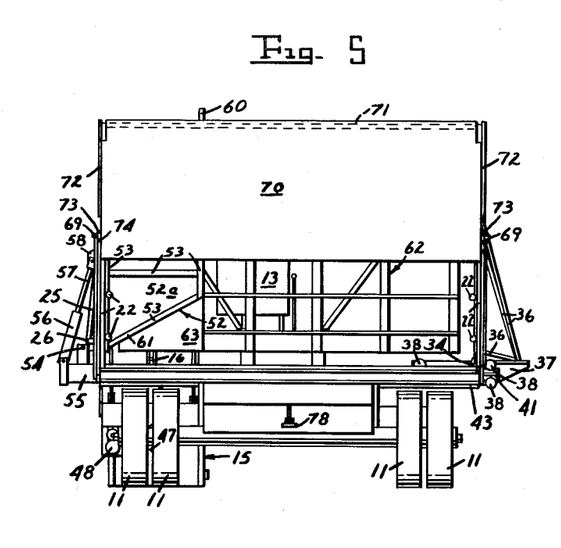
FIGURE 5 is a rear end view of the apparatus.

In order to prevent the rows of stacked bales from falling off the rear end of the storage area 21, there is provided a transverse upright rear plate 70 pivotally carried on the overhead connection 23 of the rear side rails 22 about a pivot shaft 71 (FIGURES 3 and 5). The plate 70 extends downwardly along the top portion of the side rails 22, and will prevent rearward movement of the upper bales. The lower bales in the stacks will be held on the storage area 21 due to the weight of the upper bales and frictional considerations. At each side of the plate 70 are perpendicular arcuate plates 72 (FIGURES 1 and 2) which provide side guides for the bales when the storage area 21 is tilted rearwardly and the plate 70 has pivoted in a clockwise direction as seen in FIGURE 2.

Figure 10:
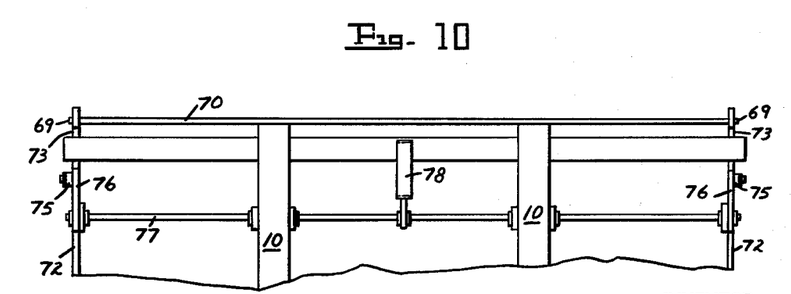
FIGURE 10 is an enlarged fragmentary bottom view of the apparatus as seen along line 10—10 in FIGURE 1.

The plate 70 is normally locked in its upright or vertical position by means of outwardly protruding rods 69 fixed to the side edges of the plate 70 and complementary latches 73 pivoted at 74 to the side rails 22 and connected by means of an upright rod 75 to a lower operating crank 76. There is provided a latch 73 and connecting rod 75 at each side of the apparatus, and the two cranks 76 are each fixed to a pivot shaft 77 that extends across the full width of the structure (FIGURE 10). At the center of the shaft 77 is an operating boot 78 that extends both rearwardly and downwardly. The operating boot 78 is adapted to rotate the shaft 77 in a clockwise direction as shown in FIGURE 2 and thereby cause the crank 76 at each side of the structure to lift the respective latches, thereby permitting the rear plate 70 to be pivoted relative to the side rails 22 and the remainder of the storage area 21.

The storage area 21 is tilted relative to the chassis 10 about a pivot shaft by conventional means utilized for tilt beds or dump trucks, and there is generally shown in the drawings a cylinder 80 connected about a pivotal axis on the chassis 10 and having a piston rod 81 whose outer end is pivotally connected to the lower surface of the storage area 21.

One further development has been found to be advisable in order to mechanically stack bales by the instant mechanism. A spring leaf 85 is pivotally carried by an upstanding support 86 on the front wall 62 and extends rearwardly directly above bales moved to the side by wall 24. The leaf 85 is movable from a lower position wherein it bears against the top of a bale stack to a raised position wherein bale stacks may pass freely beneath it (FIGURE 1). This movement is accomplished by a double acting power cylinder 87 pivoted to leaf 85 and wall 62. Leaf 85 prevents bales from falling back into the stacking area.

The cylinder 87 is preferably connected in series with cylinder 31 that operates the first wall 24. By placing cylinder 87 before cylinder 31 in a manually or automatically operated hydraulic circuit, the leaf 85 will be raised prior to pushing of a bale stack by wall 24 and will be lowered prior to retraction of wall 24. No movement of leaf 85 is necessary during pushing of a row of stacked bales by wall 62, since it will move as a unit with the bale it engages. Upon retraction of wall 62, leaf 85 will merely slip over the surface of the top bale.

It is believed that the operation of this structure is evident from the foregoing disclosure, but the specific steps are best understood by following the schematic drawings illustrated in FIGURES 11 through 16.

Figure 11:
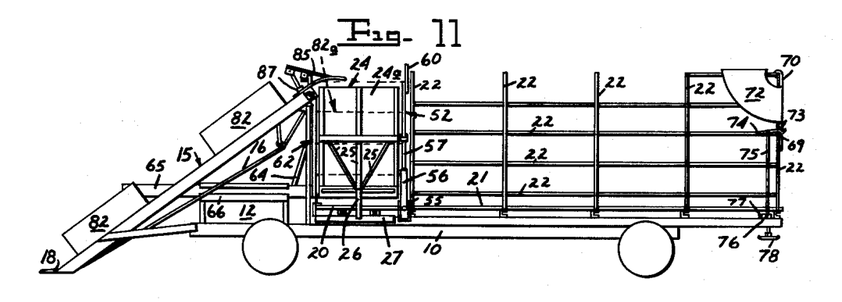
FIGURE 11 is a side elevation view showing the delivery of bales.
Figure 12:
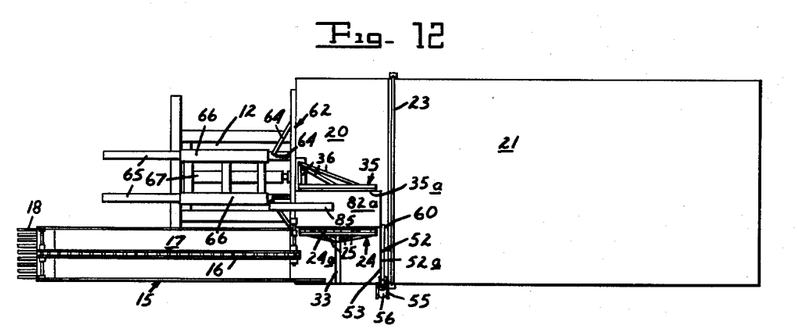
FIGURE 12 is a top view showing the lateral shifting of a first stack of bales.
Figure 13:
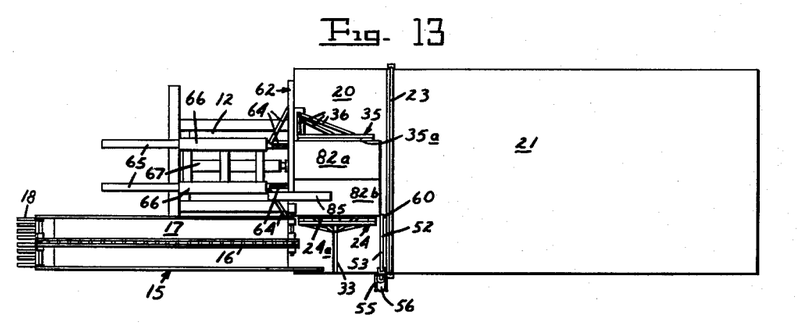
FIGURE 13 is a top view showing the lateral shifting of the first and second stacks of bales.

In FIGURE 11, bales of hay 82 are shown traveling upwardly along the chain 16, where they will be received between the walls 24, 35, 52 and 62, which will bound an area on the assembly area 20 equal in width and length to the width and length of the bales 82. These bales 82 will form a vertical stack as shown at 82a in FIGURE 11. After the stack 82a has reached the desired height, the stack 82a is shifted laterally inward across the assembly area 20 in the manner shown in FIGURE 12. When the first wall 24 is actuated to shift the stack 82a, the abutting second wall 35 will yieldably move in conjunction with the stack 82a and wall 24 to a laterally displaced position, thereby preventing any of the bales 82 from toppling from the stack. The wall 24 then returns to its initial position at the side of the assembly area 20 and a second stack 82b is formed directly adjacent to the first stack 82a.

Figure 14:
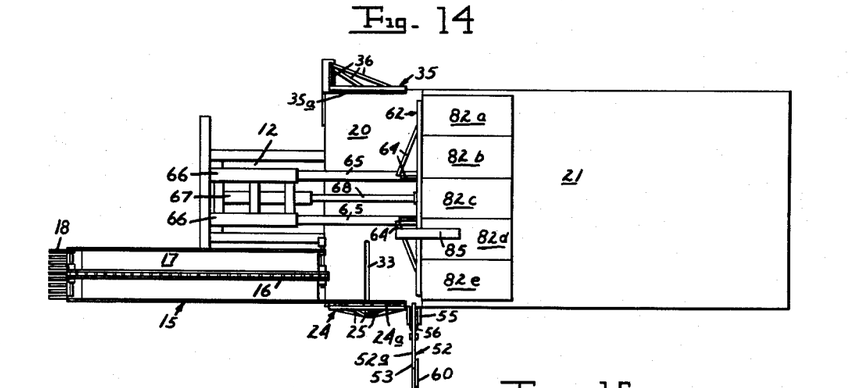
FIGURE 14 is a top view showing the rearward shifting of the first row of stacked bales.
Figure 15:
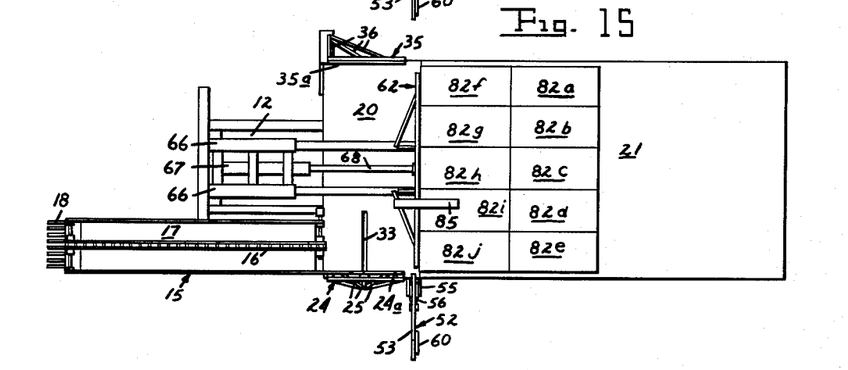
FIGURE 15 is a top view showing the rearward shifting of the first two rows of stacked bales.

The first row of stacks shown in FIGURE 14 is formed by shifting successive stacks transversely until the bales are located over the assembly area 20. The five stacks of the first row shown in the example are indicated as 82a through 82e. At this time, the third wall 52 is moved outwardly to clear the assembly area 20, this being accomplished by pivoting of the wall 52 about its pivot shaft 54. The row of stacked bales 82a through 82e can then be shifted rearwardly by means of the fourth wall 62 in the manner shown in FIGURE 14. All of the walls are then returned to their initial positions, to build a second row of stacked bales 82f through 82j, which also is shifted rearwardly in the same sequence (FIGURE 15).

Figure 16:
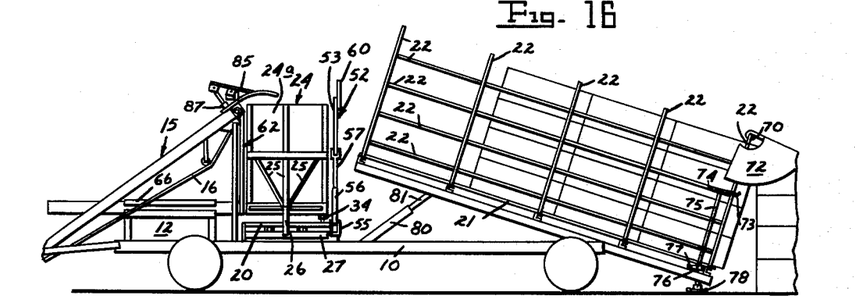
FIGURE 16 is an elevation view showing the unloading of bales from the apparatus.

After the storage area 21 has been filled with successive rows of stacked bales, the apparatus is driven to an unloading area such as one adjacent a storage or transport facility, and the tilt cylinder 80 is actuated to raise the front end of the storage area 21, as shown in FIGURE 16. Contact of the ground by the operating boots 78 will cause the rear plate 70 to be released, so that the stacked bales can fall from the rear of the storage area 21 in loose stacked rows as the apparatus is driven forwardly. The cylinder 80 is then used to return the storage area 21 to its original horizontal position for field use in picking up additional bales.

The controls required to carry out these operations can be manual or automatic. In the structure illustrated, manual controls have been used quite effectively. The various cylinders 31, 56, 67, and 80 are preferably double acting hydraulic cylinder assemblies of conventional design and can be operated by conventional manual valves. The operating handles for the valves would be included in the controls 14 located about the operator's seat 13. By the same token, motor 48, that returns the wall 35 to its initial position shown in dashed lines in FIGURE 3, can also be manually actuated in the desired sequence. Obviously, such controls could readily be made to operate in an automatic sequence with various interlocks to prevent movement of one wall while another is in its path of travel. However, this invention is concerned primarily with the bunching of the bales by the mechanical structure described and not with the controls utilized to operate the various mechanisms.

Having thus described my invention, I claim:

1. A bale buncher, comprising:
a mobile framework including a rectangular horizontal top surface;
an elevating conveyor mounted on said framework adapted to deliver bales above one corner of said top surface in a vertical stack;
a first upright movable wall mounted on said framework along one transverse edge of said top surface at said one corner thereof, adapted to abut a stack of bales delivered by said elevating conveyor, said first wall being movable inwardly from the surface transverse edge a distance equal to the width of the stack of bales abutted thereby;
a second upright movable wall parallel to said first wall and spaced therefrom above said surface adapted to abut the stack of bales oppositely to said first wall, said second wall being yieldably movable relative to said top surface in a transverse direction;
a third upright movable wall mounted on said framework perpendicular to said first wall at the rear corner thereof and extending inwardly across said top surface a distance equal to the width of the stack of bales abutted thereby, said third wall being movable to a location outward of said first wall;
and a fourth upright movable wall at the front of said top surface adapted to abut the front edge of a stack of bales on said top surface, said fourth wall being movable rearwardly a distance equal to the length of the abutted stack of bales.

2. A bale buncher, comprising:
a mobile supporting framework having a horizontal top surface including an assembly area extending across the front of the top surface relative to the intended direction of travel of said framework and a rearwardly adjacent storage area normally coplanar with said assembly area;
delivery means mounted on said conveyor leading to said assembly area adapted to vertically stack bales on said top surface within a rectangular area bounded by first, second, third and fourth upright movable walls;
said first wall being mounted on said framework above said top surface in an initial position adjacent one side edge of said assembly area and extending longitudinally along said framework, said first wall being selectively movable inwardly across said assembly area a distance equal to the width of a bale stack delivered by said delivery means;
said second wall being mounted on said framework above said top surface parallel to and spaced from said first wall, said second wall being yieldably movable in a direction opposite to the location of said first wall, the minimum separation between said first and second walls when said first wall is at its initial position being a distance equal to the width of a bale stack delivered by said delivery means;
said third wall being mounted on said framework above said top surface and normally extending perpendicularly across the rear ends of said first and second walls, said third wall being selectively movable outwardly relative to said framework to a position located outward of said first wall when said first wall is in its initial position;
and said fourth wall being mounted on said framework above said top surface in a first location extending across the entire front end of said assembly area, said fourth wall being selectively movable to a second location situated rearwardly a distance equal to the length of a bale stack delivered by said delivery means.

3. A bale buncher as defined in claim 2 wherein the storage area of said top surface is tiltable about a transverse horizontal axis whereby the rear edge of said storage area can be lowered relative to the front edge thereof, and further comprising:
a releasable rear wall on said framework extending transversely across the rear edge of said top surface adapted to selectively permit rearward movement of stacked bales past said rear wall following tilting of said storage area.

4. A bale buncher as defined in claim 2 further comprising:
power means operatively connected between said framework and said first wall adapted to selectively cause movement of said first wall inwardly across said assembly area and to return said first wall to its initial position.

5. A bale buncher as defined in claim 2 further comprising:
pivotal support means on said framework operatively carrying said third wall for rotation about a longitudinal pivotal axis from its normal position across said first and second walls to its position outward of said first wall;
and power means on said framework operatively connected to said third wall adapted to selectively cause pivotal movement of said third wall about said axis between its normal position and its position outward of said first wall.

6. A bale buncher as defined in claim 2 further comprising:
a motor assembly on said framework having an output shaft;
means connecting said output shaft and said second wall whereby the inertia of said motor is utilized to yieldably oppose motion of said second wall in a direction opposite to the location of said first wall, said motor being selectively utilized to return said second wall across said top surface in a direction toward said first wall.

7. A bale buncher as defined in claim 2 further comprising:
power means operatively connected between said framework and said fourth wall adapted to selectively cause movement of said fourth wall between said first and second locations.

References Cited by the Examiner
UNITED STATES PATENTS

| Re 25,750 | 3/1965 | Adams | 214—6 |
| 2,702,131 | 2/1955 | Leupke | 214—6 |
| 2,822,659 | 2/1958 | Moore | 214—6 |
| 2,848,127 | 10/1958 | Grey | 214—6 |
| 3,159,287 | 12/1964 | Stroup | 214—6 |

GERALD M. FORLENZA, *Primary Examiner.*

M. TEMIN, *Assistant Examiner.*